(12) United States Patent
Gorokhov et al.

(10) Patent No.: US 7,929,496 B2
(45) Date of Patent: Apr. 19, 2011

(54) METHOD AND APPARATUS FOR IMPLEMENTING COMPOSITE CHANNEL TREES FOR RESOURCE ASSIGNMENTS

(75) Inventors: Alexei Gorokhov, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 11/923,961

(22) Filed: Oct. 25, 2007

(65) Prior Publication Data

US 2008/0101261 A1    May 1, 2008

Related U.S. Application Data

(60) Provisional application No. 60/854,897, filed on Oct. 26, 2006.

(51) Int. Cl.
*H04W 4/00* (2009.01)
(52) U.S. Cl. .................................. 370/329; 370/348
(58) Field of Classification Search .................. None
See application file for complete search history.

(56) References Cited

U.S. PATENT DOCUMENTS

| | | | |
|---|---|---|---|
| 5,191,576 A | 3/1993 | Pommier et al. | |
| 7,230,909 B1 | 6/2007 | Raissinia et al. | |
| 2006/0029011 A1 | 2/2006 | Etemad et al. | |
| 2006/0083183 A1* | 4/2006 | Teague et al. | 370/278 |
| 2006/0209754 A1* | 9/2006 | Ji et al. | 370/329 |
| 2006/0233124 A1* | 10/2006 | Palanki | 370/319 |
| 2008/0198774 A1 | 8/2008 | Li | |
| 2008/0205350 A1 | 8/2008 | Sim | |
| 2009/0141697 A1 | 6/2009 | Hofmann | |

* cited by examiner

*Primary Examiner* — Hong Cho
*Assistant Examiner* — Ajay P Cattungal
(74) *Attorney, Agent, or Firm* — Donald C. Kordich

(57) ABSTRACT

Methods and apparatus are disclosed for implementing composite channel trees for resource assignment. The composite channel tree includes a binary channel tree structure and at least one supplemental node facilitated by an additional bit to the channel identification. The methods and apparatus provide overcome defragmentation problems related in a binary code tree and reduces granularity issues related to the binary tree.

50 Claims, 14 Drawing Sheets

NARROWBAND PERSISTENT ASSIGNMENTS

METHOD AND APPARATUS FOR IMPLEMENTING COMPOSITE CHANNEL TREES FOR RESOURCE ASSIGNMENTS

This application claims the benefit of U.S. Provisional Patent Application Ser. No. 60/854,897, filed Oct. 26, 2006, entitled "THE METHOD AND APPARATUS FOR USING A COMPOSITE CHANNEL TREES FOR RESOURCE ASSIGNMENTS," the entirety of this application is also incorporated herein by reference.

BACKGROUND

I. Field

The present disclosure relates generally to wireless communication, and more particularly to implementing a composite channel tree for resource assignments.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Resource assignments in such MIMO systems and other wireless communication systems generally rely on a binary channel tree for assignment. The binary tree offers acceptable encoding efficiency for an assignment process that utilizes a small number of bits (e.g., six bits or less). However, binary channel tree resource assignment experience granularity issues and fragmentation issues.

In terms of granularity, assignment sizes are limited to powers of (e.g., 2, 4, 8, 16, 32, 64, 128 and the like). Thus, if assignment only requires 100 resources, for example 100 carriers, the binary channel tree requires that 128 resources be assigned or multiple assignments be made to account for the 100 required resources. In either instance, in which 128 resources would be assigned or multiple assignments made, the procedure is economically inefficient.

In terms of fragmentation, narrowband assignments can render the available resources unaddressable with a single channel identification. Thus, if an assignment requires 256 resources, for example 256 subcarriers, the assignment would generally require a high node assignment on the binary channel tree. However, if a previous assignment has been assigned a base node then all the parent nodes that include the base node are unaddressable. Thus, fragmentation issues result in inefficient assignment of network resources.

In view of at least the above, a need exists for a resource assignment system and/or methodology for effectively and efficiently assigning resources in a wireless communication system. The desired system and/or methodology should overcome issues related to fragmentation in an assignment based solely on a binary node channel tree and minimize the issues related to granularity associated with assignment based solely on a binary node channel tree

SUMMARY

The following presents a simplified summary of the disclosed aspects in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

Present aspects provide for a composite channel tree that implements a binary tree and at least one supplemental tree that overlay the binary tree. The supplemental tree is made possible by adding an additional bit to the channel identification used for channel assignments. In one aspect, a channel identification of seven bits or more may be used for channel assignments. The resulting composite channel tree resolves the fragmentation issues associated with a single binary tree and reduces issues related to granularity, which are associated with the single binary tree.

According to an aspect, a method for assigning resources in a wireless communication network id defined. The method includes providing for a composite channel tree structure. The composite channel tree structure includes a binary node tree and at least one supplemental node. The method additionally includes generating an indexed table using the composite channel tree and assigning resources according to the indexed table.

According to one aspect of the method the at least one supplemental node is facilitated by addition of a bit to a channel identification. Thus, the method may additionally include providing for a channel identification of at least 7 bits. The at least one supplemental node provides for defragmentation of resource assignments and/or reduced granularity in assigning resources.

According to another aspect, a network apparatus for assigning resources in a wireless communication network is defined. The network apparatus includes means for providing for a composite channel tree structure. The composite channel tree structure includes a binary node tree and at least one supplemental node. The network apparatus additionally includes means for generating an indexed table using the composite channel tree and means for assigning resources according to the indexed table.

According to yet another aspect, an apparatus for generating and communicating codebooks in a multiple access wireless communication system, such as SDMA or the like, includes means for providing for a plurality of preferred precoding matrices and means for generating a codebook at an access network. The codebook includes a plurality of preferred precoding matrices. The apparatus additionally includes means for communicating the codebook to one or more access terminals.

Yet another aspect relates to a computer-readable medium. The medium includes code for causing to provide for a composite channel tree structure. The composite channel tree structure includes a binary node tree and at least one supplemental node. The medium additionally includes code for causing a computer to generate an indexed table using the composite channel tree and code for causing a computer to assign resources according to the indexed table.

A further aspect is provided for by an integrated circuit that executes computer-executable instructions for assigning resources in a wireless communication network. The instructions include providing for a composite channel tree structure. The composite channel tree structure includes a binary node tree and at least one supplemental node. The instructions additionally include generating an indexed table using the composite channel tree and assigning resources according to the indexed table.

Another related aspect is provided for by a network apparatus for assigning resources in a wireless communication network. The network apparatus includes at least one processor and a memory coupled to the at least one processor. The apparatus additionally includes a composite channel tree structure including a binary node tree and at least one supplemental node, an index table generator stored in the memory, executable by the at least one processor and operable to generate an index table using the composite channel tree and a resource assigner stored in the memory, executable by the least one processor and operable to assign resources according to the index table.

According to an aspect, a method for receiving and applying resource assignments at an access terminal is defined. The method includes receiving forward link and reverse link resource assignments. The resource assignments are based on an index table generated by using a composite channel tree that comprises a binary node tree and at least one supplemental node. The method further comprises applying resources according to the forward link and reverse link resource assignments.

According to another aspect, an apparatus for receiving and applying resource assignments in a wireless communication network is provided. The apparatus includes means for receiving forward link and reverse link resource assignments. The resource assignments are based on an index table generated by using a composite channel tree that comprises a binary node tree and at least one supplemental node. The apparatus further includes means for applying resources according to the forward link and reverse link resource assignments.

Yet another aspect relates to a computer-readable medium. The medium includes code for causing a computer to receive forward link and reverse link resource assignments. The resource assignments are based on an index table generated by using a composite channel tree that comprises a binary node tree and at least one supplemental node. The medium additionally includes code for causing a computer to apply resources according to the forward link and reverse link resource assignments.

Another related aspect is provided for by an integrated circuit that executes instructions for receiving and applying resource assignments in a wireless communication network. The instructions include receiving forward link and reverse link resource assignments. The resource assignments are based on an index table generated by using a composite channel tree that comprises a binary node tree and at least one supplemental node. The instructions additionally include applying resources according to the forward link and reverse link resource assignments.

A further related aspect is defined by an apparatus for receiving and applying resource assignments in a wireless communication network assigning resources in a wireless communication network. The apparatus includes at least one processor and a memory coupled to the at least one processor. The apparatus additional includes a resource assignment module stored in the memory and executable by the at least one processor. The resource assignment module is operable to receive forward link and reverse link resource assignments, wherein the resource assignments are based on an index table generated by using a composite channel tree that comprises a binary node tree and at least one supplemental node and wherein the resource assignment module is further operable to apply resources according to the forward link and reverse link resource assignments.

To the accomplishment of the foregoing and related ends, one or more aspects include the features hereinafter fully described and particularly pointed out in the claims. The following description and the annexed drawings set forth in detail certain illustrative aspects of the disclosed aspects. These aspects are indicative, however, of merely a few of the various ways in which the principles of various aspects may be employed. Further, the disclosed aspects are intended to include all such aspects and their equivalents.

DETAILED DESCRIPTION

Figure 1:
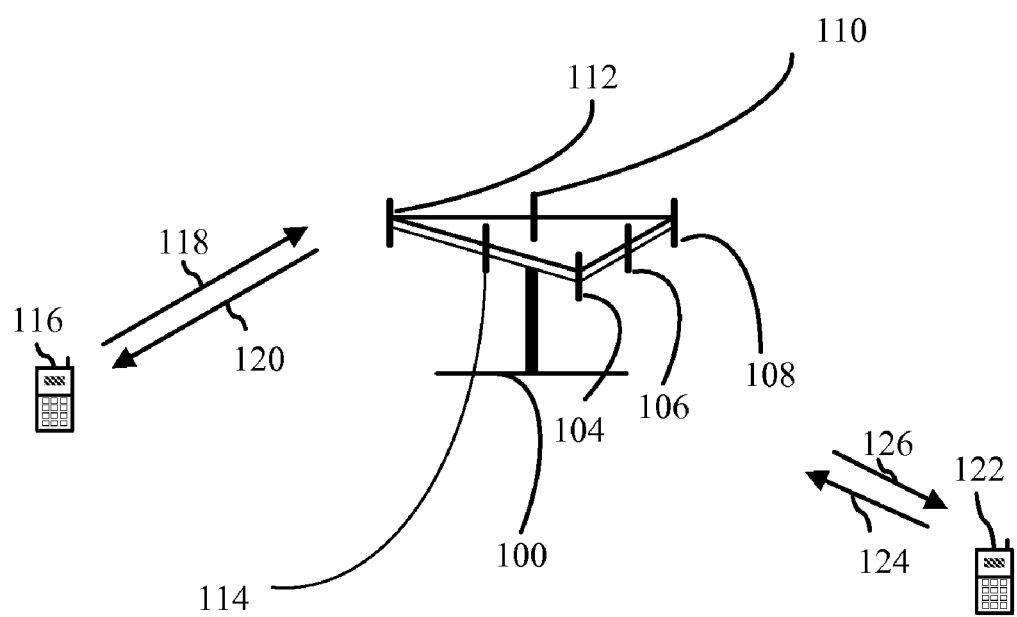
FIG. 1 illustrates a multiple access wireless communication system according to various aspects described herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network, such as the Internet, with other systems by way of the signal).

Furthermore, various aspects are described herein in connection with an access terminal and/or an access network. An access terminal may refer to a device providing voice and/or data connectivity to a user. An access wireless terminal may be connected to a computing device such as a laptop computer or desktop computer, or it may be a self-contained device such as a cellular telephone. An access terminal can also be called a system, a subscriber unit, a subscriber station, mobile station, mobile, remote station, remote terminal, a wireless access network, wireless terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. An access network, otherwise referred to as a base station or base station controller (BSC), may refer to a device in an access network that communicates over the air-interface, through one or more sectors, with wireless terminals. The access network may act as a router between the wireless terminal and the rest of the access network, which may include an Internet Protocol (IP) network, by converting received air-interface frames to IP packets. The access network also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ), and integrated circuits such as read-only memories, programmable read-only memories, and electrically erasable programmable read-only memories.

Various aspects will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

In accordance with present aspects, a composite channel tree structure is provided for assigning resources in a wireless communication network. A channel tree may be used to address assignments (for, example hop-ports) that are associated with each node identification number (NodeID) in the tree. A hop port being the fundamental unit of resource assignment. According to aspects, a set of channel identifications (IDs) is mapped to a node and a node is mapped to a physical resource. Each node on the tree is given a unique channel ID. Further, each base node is mapped to a set of hop ports. Each hop port maps to one unique subcarrier. The mapping of hop-ports to sub-carriers varies with time according to hopping rules specified in the Physical Layer specification. A channel ID completes the mapping to the set of hop ports.

The composite channel tree structure includes a binary node channel tree and at least one supplemental channel tree that overlays the binary node channel tree. The supplemental channel trees are made feasible by adding a single bit or more to the channel identification. Thus, in one aspect, a channel ID of 7 bits or more may be used for channel assignments. By augmenting the binary node channel tree with a supplemental node channel tree fragmentations issues prominent in the binary node channel tree are eliminated and granularity issues associated with the binary node channel tree are lessened.

Figure 2:
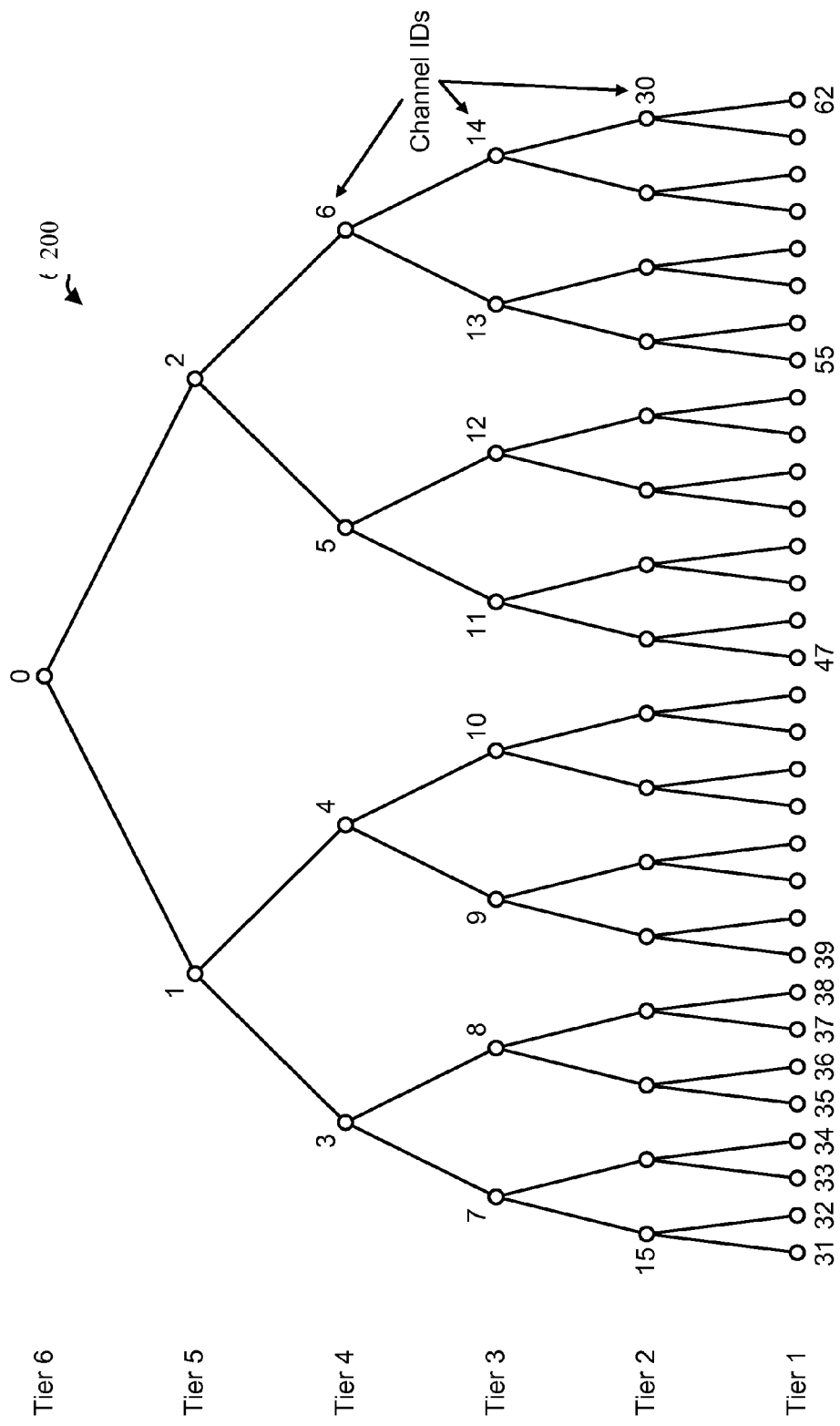
FIG. 2 illustrates a binary node channel tree in accordance with various aspects set forth herein.

FIG. 2 illustrates aspects of a binary channel tree 200, in accordance with present aspects. As previously noted, present aspects provide for the binary channel tree to be augmented with a supplemental channel tree. Examples of supplemental channel tress are shown in relation to FIGS. 3-5 and will be discussed, infra. For the aspect shown in FIG. 2, S=32 sub-carrier sets are available for use. A set of traffic channels may be defined with the 32-subcarrier sets. Each traffic channel is assigned a unique channel ID and is mapped to one or more subcarrier sets in each time interval. For example, a traffic channel may be defined for each node in channel tree 200. The traffic channels may be sequentially numbered from top to bottom and from left to right for each tier. The largest traffic channel corresponding to the topmost node is assigned a channel ID of 0 and is mapped to all 32 subcarrier sets. The 32 traffic channels in the lowest tier 1 have channel IDs of 31 through 62 and are called base traffic channels. Each base traffic channel is mapped to one subcarrier set.

The single binary tree structure shown in FIG. 2 places certain restrictions on the use of the traffic channels for an orthogonal system. For each traffic channel that is assigned, all traffic channels that are subsets (otherwise referred to as children or descendants) of the assigned traffic channel and all traffic channels for which the assigned traffic channel is a subset are restricted. The restricted traffic channels are not used concurrently with the assigned traffic channel so that no two traffic channels use the same subcarrier set at the same time. This feature results in fragmentation of the binary channel tree because once a base node (nodes 31-62 on Tier 1, which have no children or descendents) is assigned; the parent nodes (i.e., the nodes that map a superset of the hop-ports mapped by a node) are restricted. Thus, narrowband assignments can render the available resources unaddressable with a single channel ID.

Similarly, in the sole binary channel tree assignment sizes are limited to powers of two. Thus, in the example shown in FIG. 2, if a desired assignment requires 20 resources, a tier 5 assignment corresponding to node sizes of 32 would need to be assigned or multiple assignments in aggregate totaling 20 would need to be assigned. Assignment of the tier 5 node results in the assignment of more resources than are required. This is commonly referred to as granularity issues, which result from over-assignment of resources.

Figure 3:
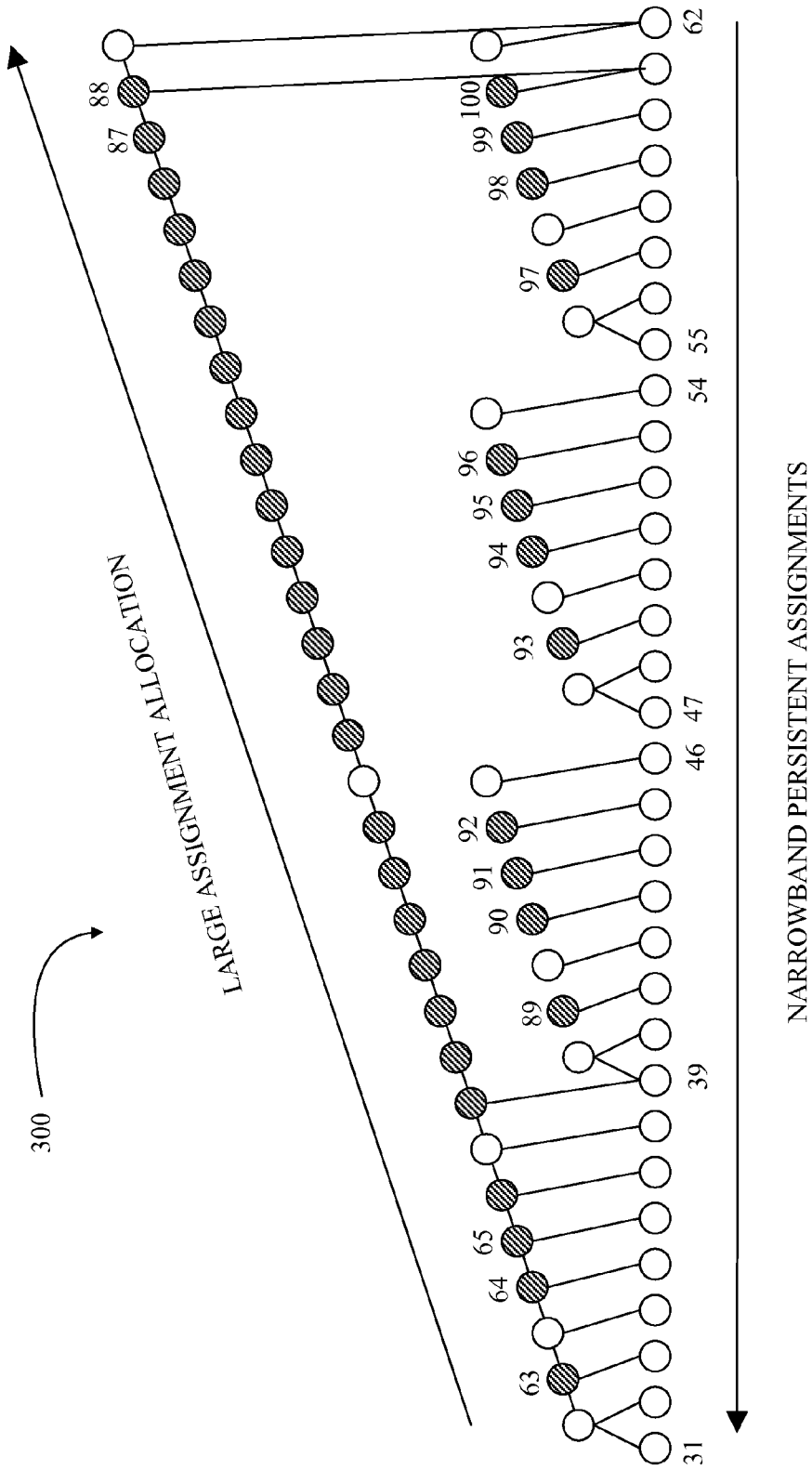
FIG. 3 illustrates an example of a supplemental node channel tree, in accordance with various aspects described herein.

FIG. 3 provides an example of a composite channel tree structure including a supplemental node channel tree that is used to augment the binary channel tree shown in FIG. 2. In the composite structure 300, additional nodes are added (for example 38 additional nodes) above the base nodes of the binary node tree structure, thereby providing channel address of 63 to 100. The 38 additional nodes, which signify the supplemental node channel tree structure, are illustrated in FIG. 3 as shaded nodes, while the un-shaded nodes represent nodes pre-existing in the binary tress structure. The additional nodes shown in FIG. 3 are made possible by an additional bit in the channel ID. Adding an additional bit provides for up to 127 additional nodes. It should also be noted that these additional nodes can be added anywhere above the base nodes of the binary node tree structure.

Additionally, the FIG. 3 example is characterized as including four list structures with a maximum size of 8 base nodes per each of the four list structures and one additional list structure with a maximum size of 32 base nodes. When bases nodes are allocated sequentially from the end of a list (i.e., the right most node in each list in FIG. 3), all remaining resources can be addressed by a single node in the list.

In the illustrated example of FIG. 3 the base nodes 31-62 may provide for narrowband persistent assignment types, such as Voice over IP (VoIP), Video Telephony (VT), link budget limitation or other narrowband persistent assignments. In such aspects, assignments may be assigned from right to left along the base node tier. When implementing the composite channel tree structure of FIG. 3 the scheduler will attempt to defragment the channel tree by allocating small assignments to adjacent nodes. For example, the scheduled may assign nodes 100, 99, 98 respectively. Large resource assignments (such as Hyper Transfer Text Protocol (HTTP) and the like) may occur from left to right across the upper diagonal chain. Thus, large assignments are not limited to the power of two assignment restrictions imposed by the sole binary node channel tree and may utilize one large segment of defragmented resource. In this regard, granularity issues prevalent in the sole binary node tree structure are lessened.

Figure 4:
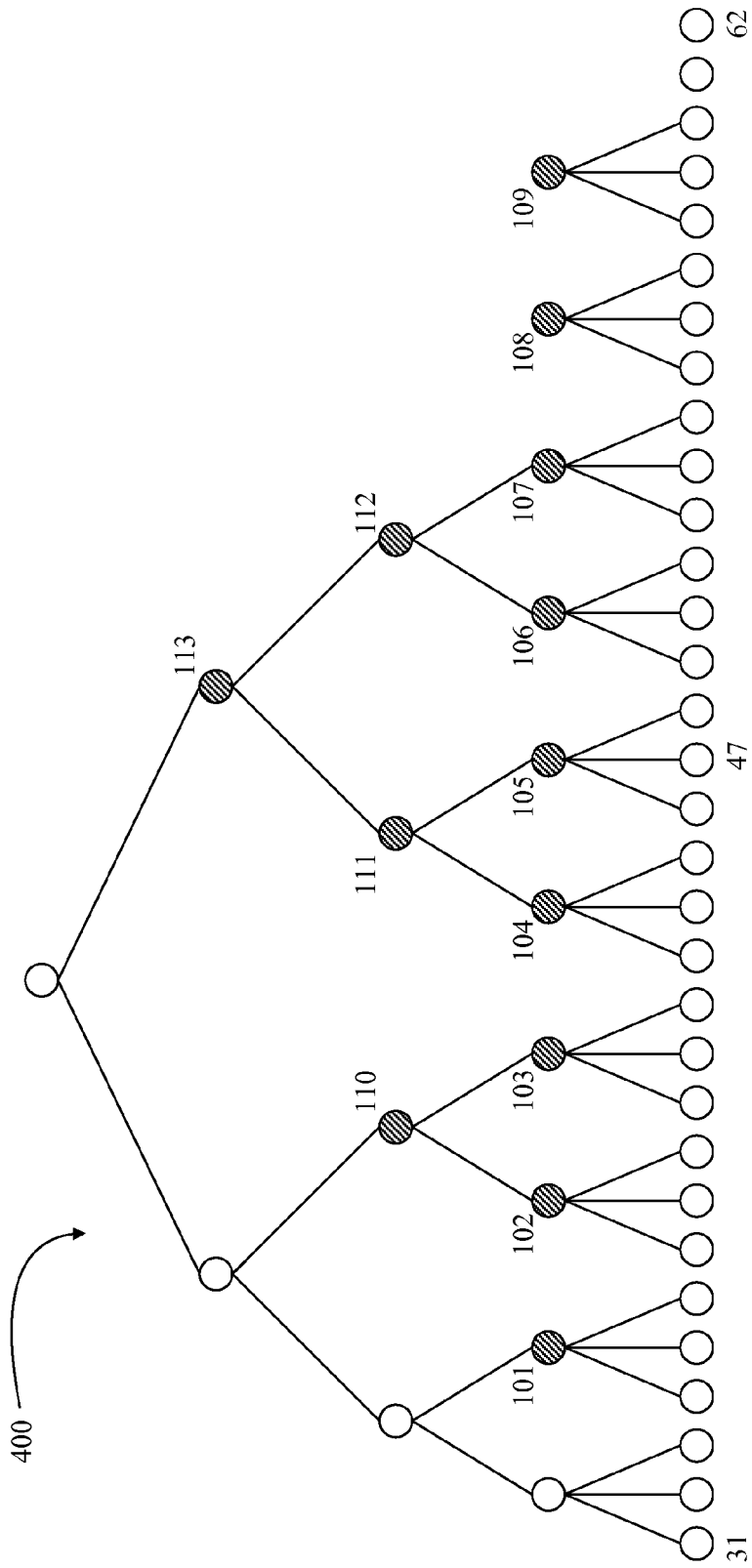
FIG. 4 illustrates another example of a supplemental node channel tree, specifically a binary tree with three base node grouping, in accordance with an aspect described herein.
Figure 5:
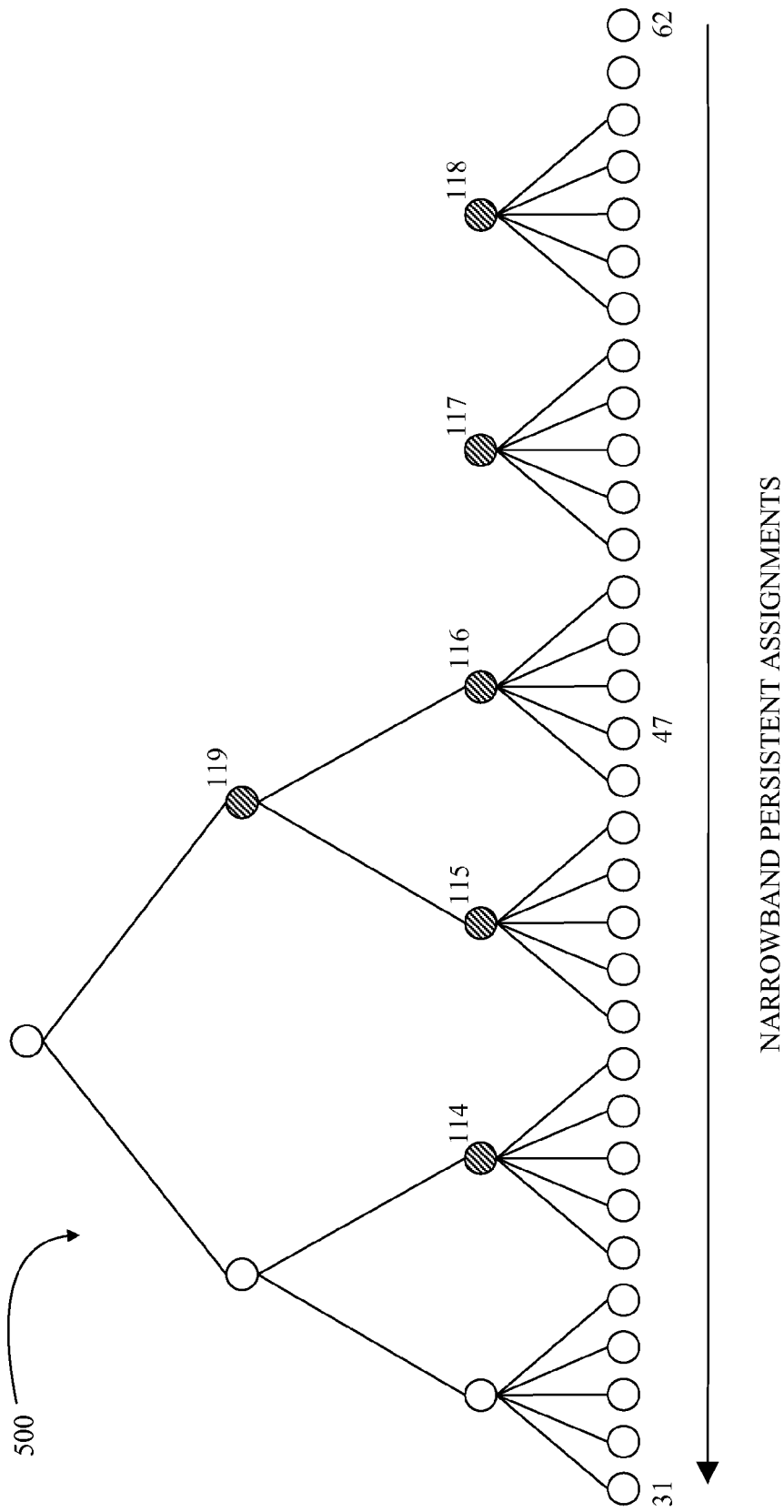
FIG. 5 illustrates another example of a supplemental node channel tree, specifically a binary node tree with five base node grouping, in accordance with an aspect herein described.

FIGS. 4 and 5 provide other examples of composite channel tree structures that include a supplemental node channel tree used to augment the binary channel tree shown in FIG. 2. In the illustrated aspects of FIGS. 4 and 5, additional nodes are added to address more assignment sizes and mixes. The supplemental nodes shown in FIGS. 4 and 5 may be augmented with the structure shown and described in relation to FIG. 3.

In the FIG. 4 example 11 additional nodes have been added to the structure 400. The additional nodes are numbered 101-113 and are designated as shaded nodes. The base nodes are grouped in threes, such that assignment may occur in powers of three (e.g., 3, 6, 12, 24). Thus, in tree structure 400 the additional nodes address assignment of size 3, 6, 12 and 24.

In the FIG. 5 example 6 additional nodes have been added to the structure 500. The additional nodes are numbered 114-119 and are designated as shaded nodes. The base nodes are grouped in fives, such that assignment may occur in powers of five (e.g., 5, 10, 20). Thus, in tree structure 500 the additional nodes address assignment in sizes 5, 10 and 20. In the aspects illustrated by FIGS. 4 and 5 narrowband persistent assignments, such as such as Voice over IP (VoIP), Voice Telephony (VT), link budget limitation or other narrowband persistent assignments, may occur from right to left along the base node tier.

It should also be noted that the examples shown in FIGS. 3-5 are not to be construed as limiting and other composite channel tree structures are also contemplated and within the scope of the present aspects. For, example, an additional tree structure may provide for a binary tree structure having supplemental nodes in which the base nodes are grouped in sevens, such that assignment may occur in powers of seven (e.g., 7, 4, 21). Thus, in such a tree structure the additional nodes address assignments in sizes of 7, 14 and 21.

Figure 6:
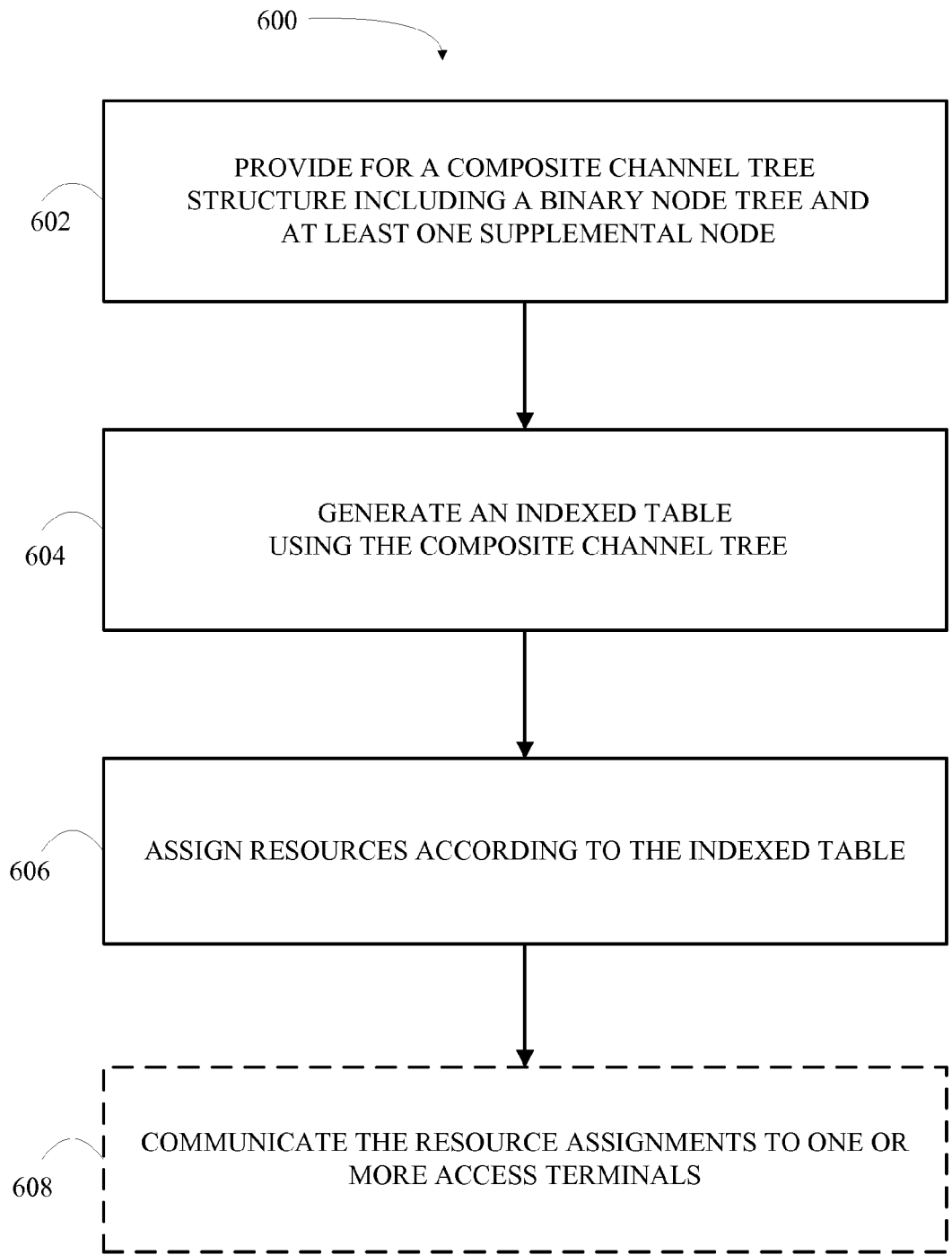
FIG. 6 is a flow diagram illustrating aspects of a method for providing for resource assignments in a wireless communication system in accordance with various aspects described herein.

Referring to FIG. 6, a flow diagram of a method 600 for assigning resources in a wireless communication system is provided. At Block 602, a composite channel tree structure is provided that included a binary node tree and at least one supplemental node. The addition of one or more supplemental nodes is facilitated by the addition of a bit to the channel ID. Thus, in some aspects, the channel ID may include at least 7 bits and the composite channel tree structure may include up to 127 supplemental nodes. The composite channel tree structure that is used for assigning resources provides for defragmentation of resource assignments by multiplexing assignments of differing sizes. Additionally, the composite channel tree structure reduces granularity in assigning resources by addressing channel sizes other than power of two channel sizes.

In one aspect, the supplemental nodes that added to the binary tree structure may provide for base node groupings of three, such that channel sizes of 3, 6, 12 and 24 are possible. In another aspect, the supplemental nodes that are added to the binary tree structure may provide for base node groupings of five, such that the channel sizes of 5, 10 and 20 are possible.

At block 604, an indexed table is generated using the composite channel tree. In some aspects, the index table will be communicated, or otherwise known, to the access terminal in the wireless communication system at the start of communication between the access terminals and the network.

At block 606, resource assignments are assigned according to the indexed table. The resource assignments may include both forward link and reverse link assignments. At optional block 608, the resource assignments are communicated to the one or more access terminals that require resources. The resource assignments may be communicated via Link Assignment Blocks (LAB) transmitted over the Slotted Seed Channel Hopping (SSCH) forward link physical layer channel.

Figure 7:
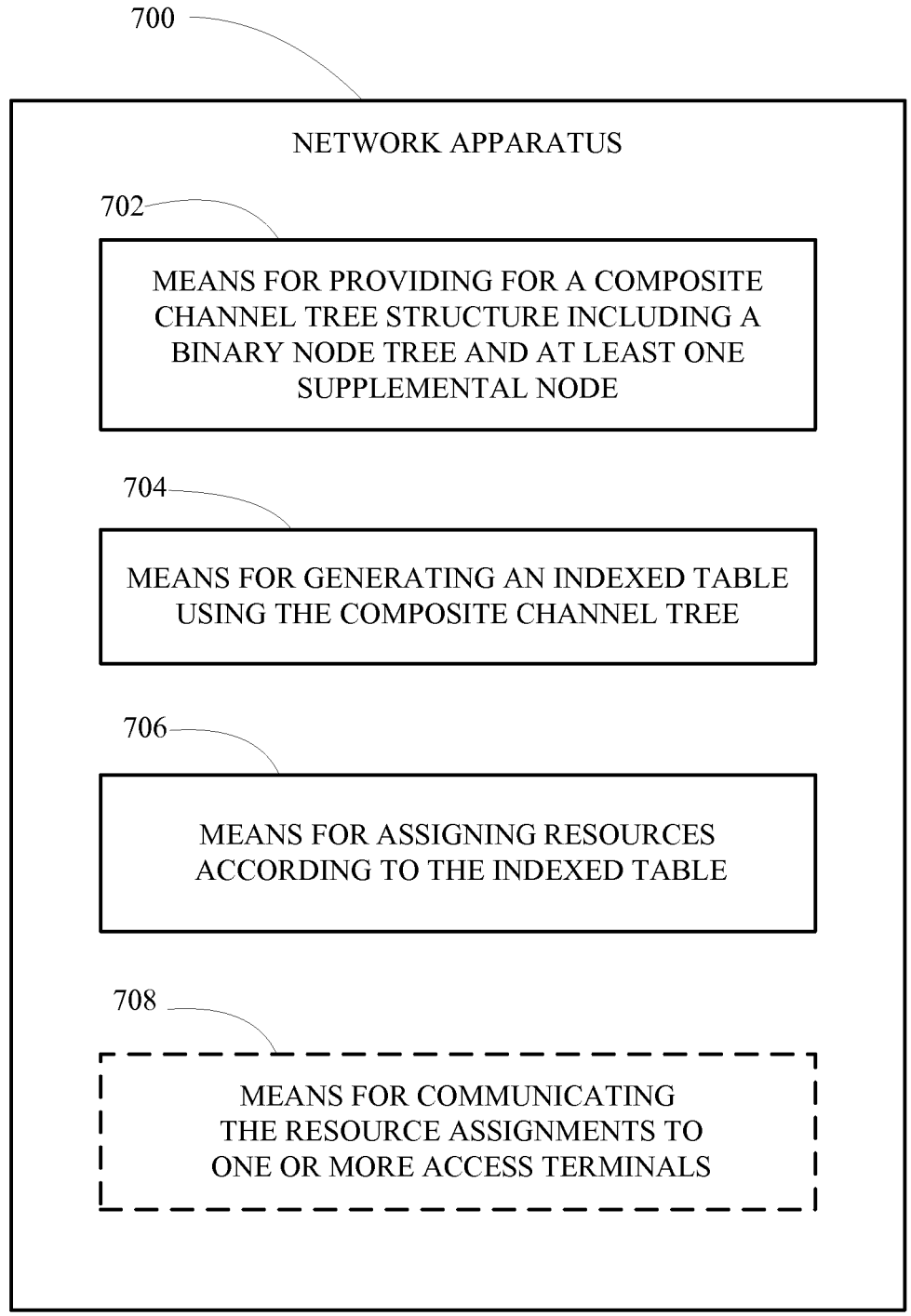
FIG. 7 is a block diagram of a network apparatus providing for resource assignments in a wireless communication system in accordance with various aspects described herein.

Referring to FIG. 7, a block diagram depiction of a network apparatus 700 is shown. The network apparatus, which may comprise one or more network devices, includes means 702 for providing for a composite channel tree. The composite channel tree includes a binary node tree structure and at least one supplemental node. The supplemental nodes are facilitated by an additional bit in the channel ID. The resulting composite channel tree provides for greater defragmentation than a single binary tree structure and lessens granularity type issues due to variance in assignment sizes.

The network apparatus 700 additionally includes means 704 for generating an index table using the composite channel tree structure and means 706 for assigning resources according to the indexed table. In some aspects, the network apparatus may additionally include, optional means 708 for communicating the resource assignments to one or more access terminals requiring resource assignment.

Figure 8:
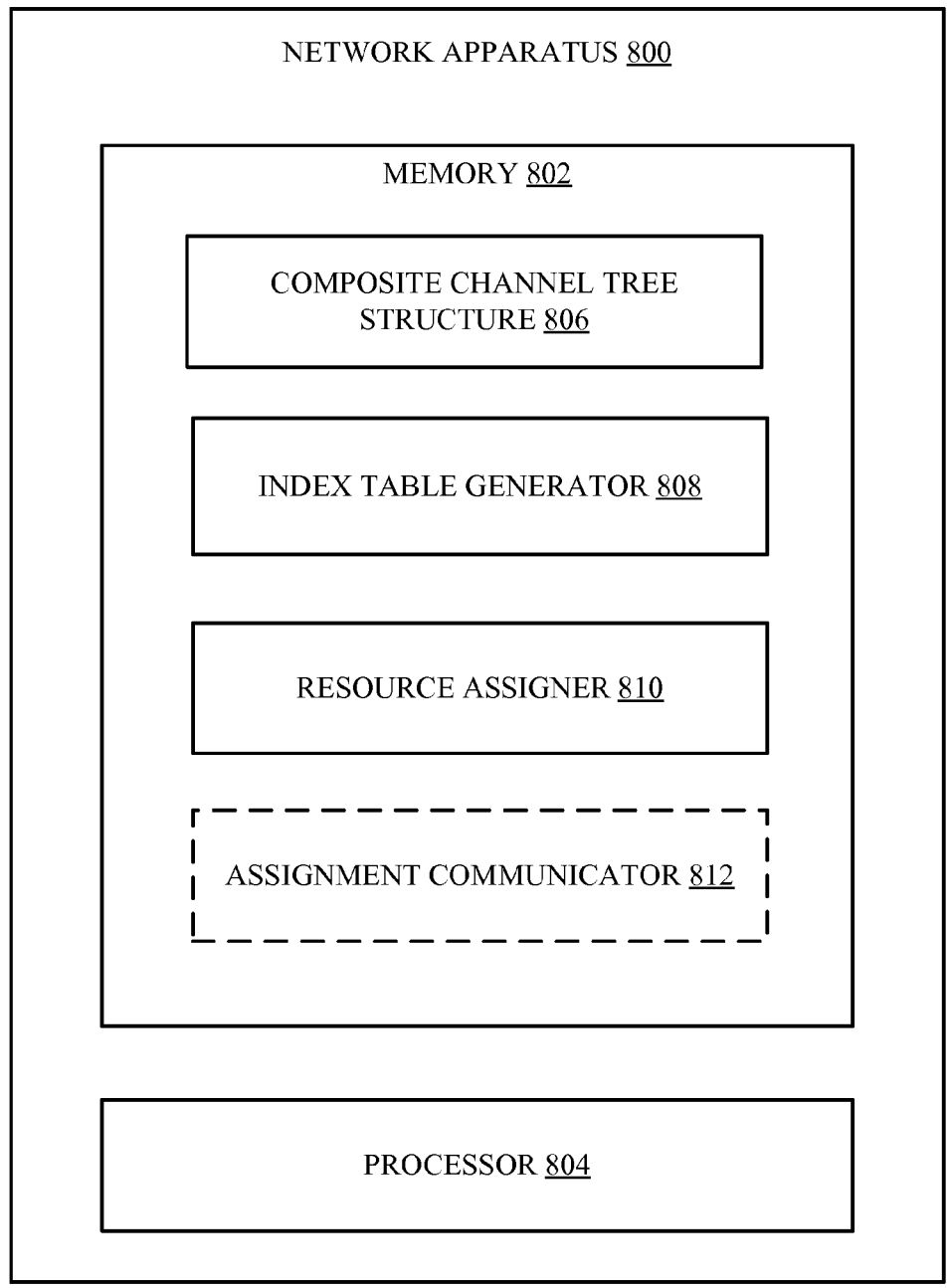
FIG. 8 is a block diagram of a network apparatus configured for providing for resource assignments in a wireless communication system in accordance with various aspects.

FIG. 8 is a block diagram of a network apparatus 800, according to various aspects. The network apparatus may be a single device or multiple devices configured to act in unison to perform the functions herein described. The access network apparatus 800 includes at least one processor 804 and memory 802 coupled to processor 804. The processor 804 may be an application-specific integrated circuit ("ASIC"), or other chipset, processor, logic circuit, or other data processing device. The memory 802 may comprise volatile and non-volatile memory such as read-only and/or random-access memory (RAM and ROM), EPROM, EEPROM, flash cards, or any memory common to computer platforms. Further, memory 802 may include one or more flash memory cells, or may be any secondary or tertiary storage device, such as magnetic media, optical media, tape, or soft or hard disk.

The memory 802 of network apparatus 800 additionally includes one or more composite channel tree structures 806 that include a binary channel tree structure and at least one supplemental node. The supplemental nodes are facilitated by the addition of a bit to the channel ID and, therefore up to 127 additional nodes may be added based on the addition of one bit to the channel ID. The composite channel tree structure provides greater defragmentation of resources and lessens granularity issues by providing for assignments of varying sizes.

The memory 802 of network apparatus 800 additionally includes an index table generator 808 executable by the at least one processor 804. The index table generator 808 is operable to generator an index table based on the composite channel tree structure 806. While the index table generator is shown in FIG. 8 as being stored in memory 802, in other aspects, the index generator 808 may be a processing subsystem of processor 804.

Additionally, memory 802 of network apparatus 800 includes a resource assignor 810 executable by the at least one processor 804. The resource assignor 810 is operable to assign resources based on the index table. While the resource assignor 810 is shown in FIG. 8 as being stored in memory 802, in other aspects, the resource assignor 810 may be a processing subsystem of processor 804. Optionally, the memory of network apparatus 800 may include an assignment communicator 812 executable by the at least one processor 804. The assignment communicator 812 is operable to communicate the resource assignment to one or more access terminals. For example, the assignment communicator may be operable to communicate the resource assignments via LAB transmitted over the SSCH forward link physical layer channel.

Figure 9:
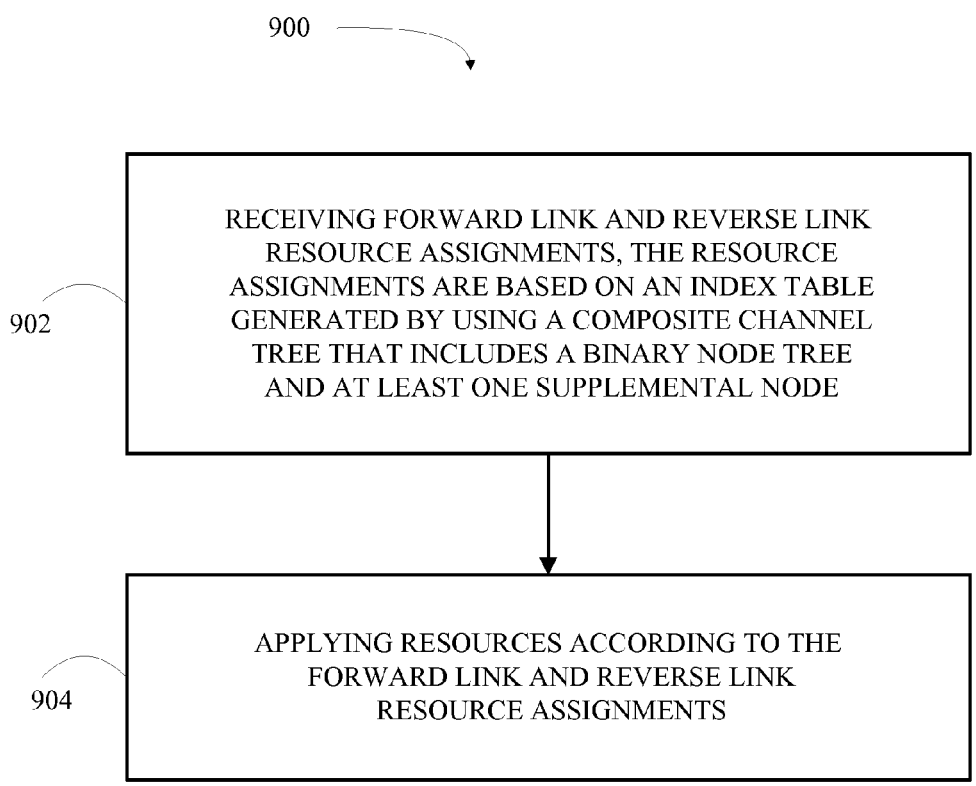
FIG. 9 is a flow diagram illustrating aspects of a method for receiving and applying resource assignments in accordance with various aspects.

Referring to FIG. 9, a flow diagram of a method 900 for receiving and applying resource assignments in a wireless communication system is provided. At Block 902, an access terminal or other networked device receives forward link and reverse link resource assignments. In accordance with aspects, the resource assignments are based on an index table generated by using a composite channel tree. The composite channel tree includes a binary channel tree structure and at least one supplemental node. The at least one supplemental node is facilitated by the addition of a bit to the channel ID and may include up to 127 supplemental nodes. As such, by using a composite channel tree to generate resource assignments, the received resource assignments provide for greater defragmentation and lessen issues related to granularity. At Block 904, resources are applied to the forward and reverse link according to the received resource assignments.

Figure 10:
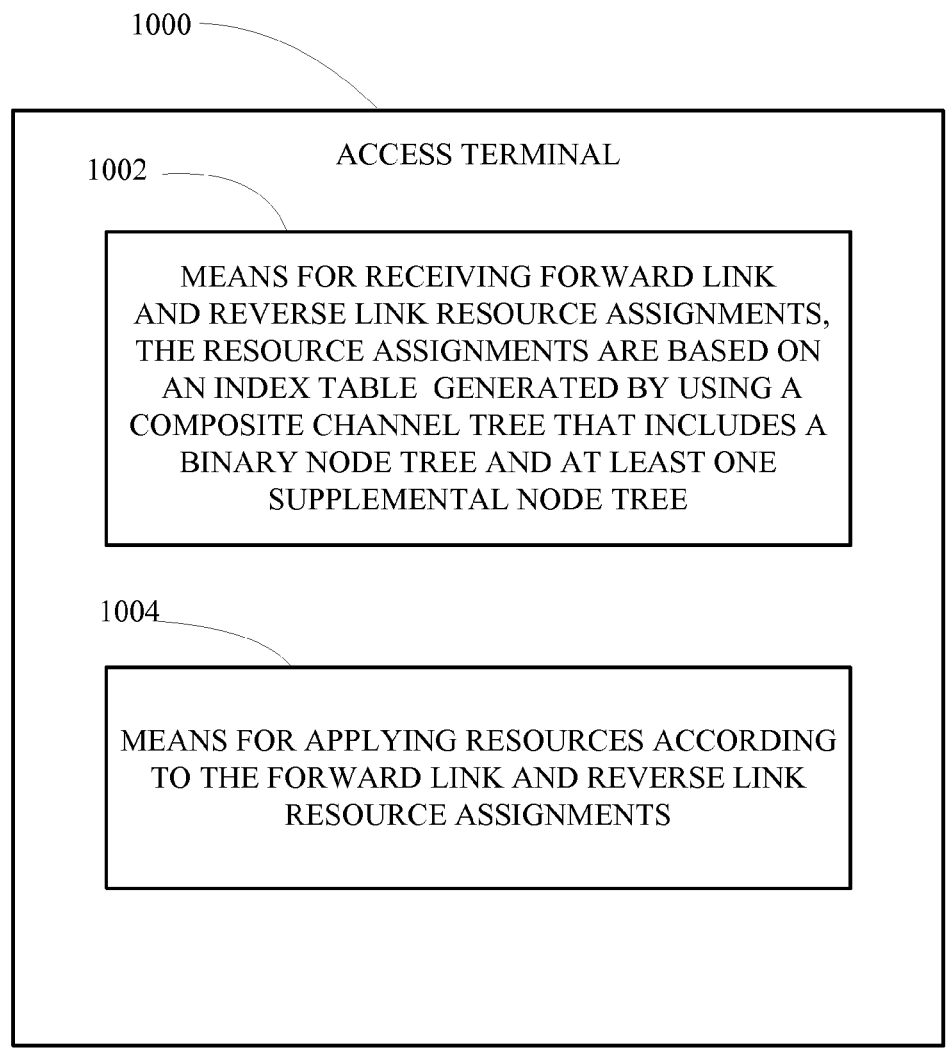
FIG. 10 is a block diagram of an access terminal for receiving and applying resource assignments in accordance with various aspects.

FIG. 10 is a block diagram depiction of an access terminal 1000, according to various aspects. The access terminal 1000 includes means 1002 for receiving forward link and reverse link resource assignments. The resource assignments are based on an index table generated by using a composite channel tree structure. The composite channel tree includes a binary channel tree structure and at least one supplemental node. The at least one supplemental node is facilitated by the addition of a bit to the channel ID and may include up to 127 supplemental nodes. As such, by using a composite channel tree to generate resource assignments, the received resource assignments provide for greater defragmentation and lessen issues related to granularity. The access terminal 1000 additionally includes means 1004 for applying resource according to the forward link and reverse link resource assignments.

Figure 11:
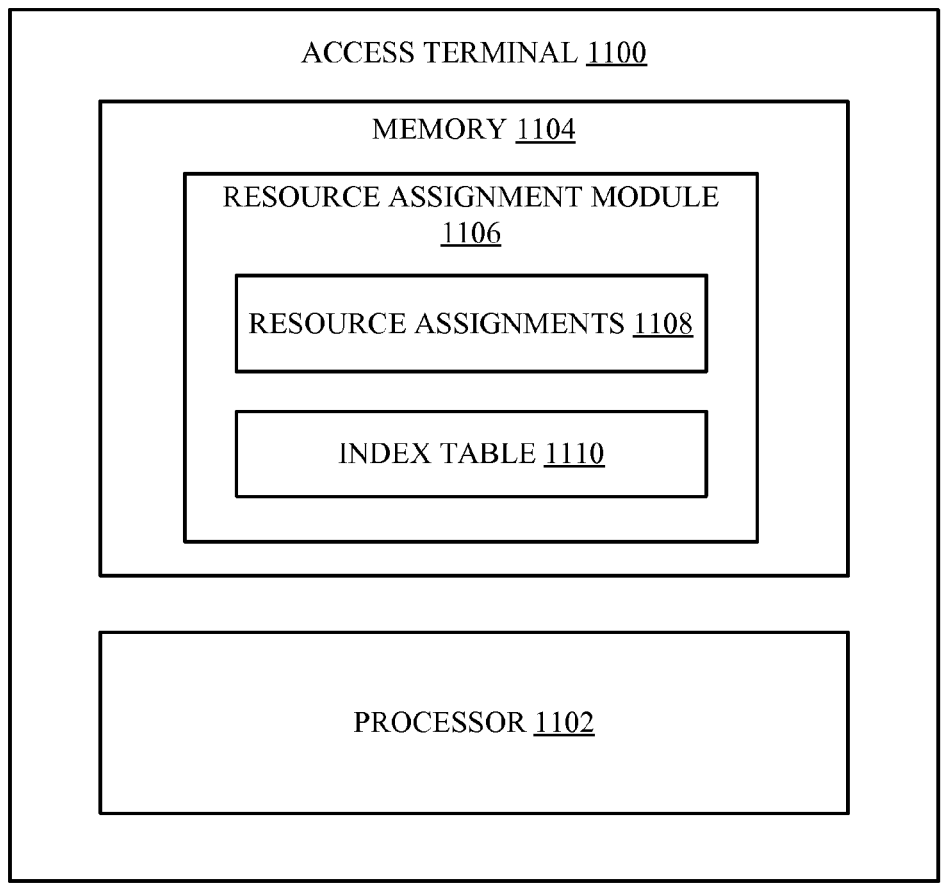
FIG. 11 is a block diagram of an access terminal for receiving and applying resource assignments in accordance with various aspects.

Referring to FIG. 11, an access terminal 1100, is depicted, in accordance with various aspects. The access terminal 1100 may comprise any type of computerized, communication device, such as cellular telephone, Personal Digital Assistant (PDA), two-way text pager, portable computer, and even a separate computer platform that has a wireless communications portal, and which also may have a wired connection to a network or the Internet. The access terminal can be a remote-slave, or other device that does not have an end-user thereof but simply communicates data across the wireless network, such as remote sensors, diagnostic tools, data relays, and the like. The present apparatus and methods can accordingly be performed on any form of wireless communication device or wireless computer module, including a wireless communication portal, including without limitation, wireless modems, PCMCIA cards, wireless devices or any combination or subcombination thereof.

The access terminal 1100 includes at least one processor 1102 and memory 1104 coupled to processor 1102. The processor 1102 may be an application-specific integrated circuit ("ASIC"), or other chipset, processor, logic circuit, or other data processing device. The memory 1104 may comprise volatile and nonvolatile memory such as read-only and/or random-access memory (RAM and ROM), EPROM, EEPROM, flash cards, or any memory common to computer platforms. Further, memory 1104 may include one or more flash memory cells, or may be any secondary or tertiary storage device, such as magnetic media, optical media, tape, or soft or hard disk.

The access terminal 1100 additionally includes a resource assignment module 1106 stored in the memory 1104 and executable by the at least one processor 1102. The resource assignment module 1106 is operable to receive a forward link and reverse link resource assignment 1108, determine the resource assignment based on the index table 1110 which has been generated based on a composite channel tree structure and apply resources based on the forward link and reverse link resource assignments.

Figure 12:
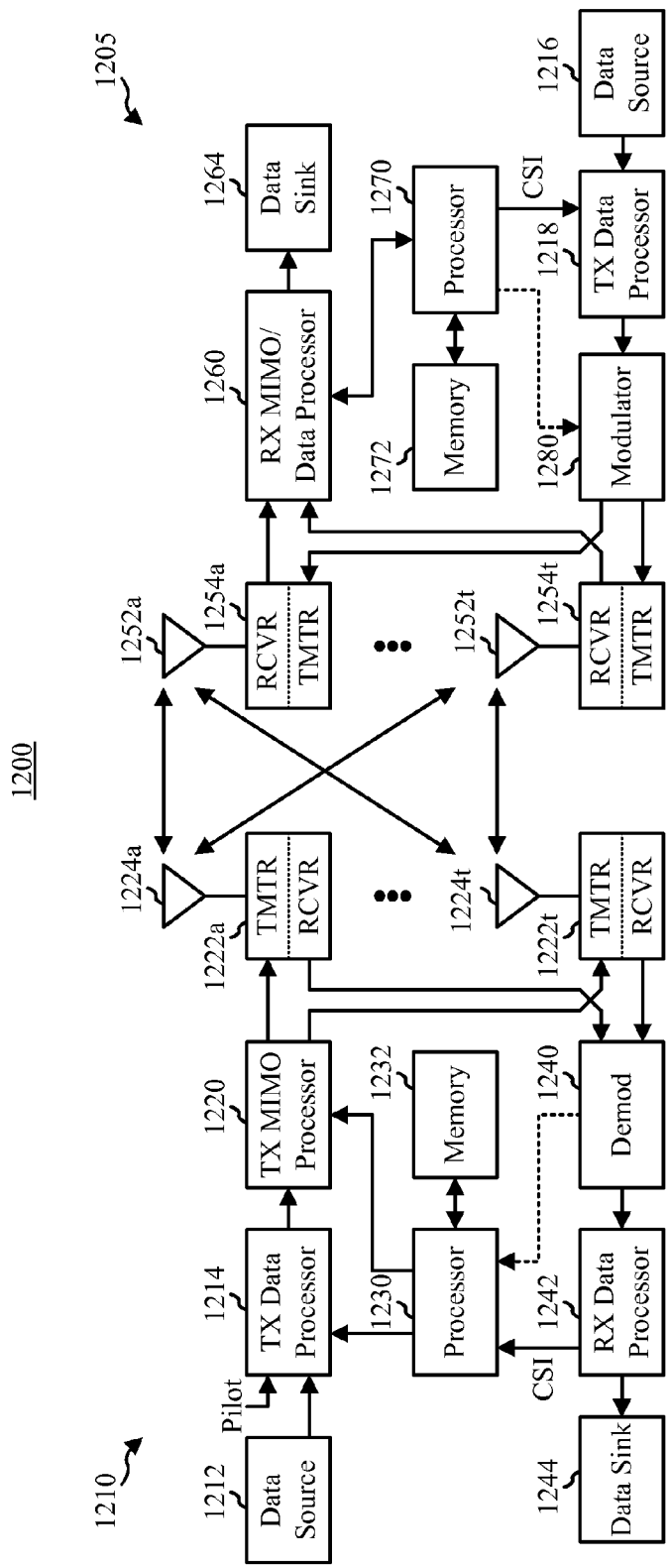
FIG. 12 illustrates a transmitter and a receiver in a multiple access wireless communication system in accordance with the various aspects.

FIG. 12 illustrates a transmitter and receiver in a multiple access wireless communication system 1200 according to various aspects presented herein. Wireless communication system 1200 depicts one base station and one user device for sake of brevity. However, it is to be appreciated that the system can include more than one base station and/or more than one user device, wherein additional base stations and/or user devices can be substantially similar or different from the exemplary base station and user device described below. In addition, it is to be appreciated that the base station and/or the user device can employ the systems and/or methods described herein to facilitate wireless communication there between.

At transmitter system 1210, traffic data for a number of data streams is provided from a data source 1212, which includes the codebook of present aspects, to a transmit (TX) data processor 1214. In some aspects, each data stream is transmitted over a respective transmit antenna. TX data processor 1214 formats, codes, and interleaves the traffic data for each data stream based on a particular coding scheme selected for that data stream to provide coded data. In some aspects, TX data processor 1214 applies beam-forming weights to the symbols of the data streams based upon the user to which the symbols are being transmitted and the antenna from which the symbol is being transmitted. In some aspects, the beam-forming weights may be generated based upon channel response information that is indicative of the condition of the transmission paths between the access network and the access terminal. The channel response information may be generated utilizing CQI (Channel Quality Indicator) information or channel estimates provided by the user. Further, in those cases of scheduled transmissions, the TX data processor 1214 can select the packet format based upon rank information that is transmitted from the user.

The coded data for each data stream may be multiplexed with pilot data using OFDM (Orthogonal Frequency Division Multiplexing) techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed or provided by processor 1230. In some aspects, the number of parallel spatial streams may be varied according to the rank information that is transmitted from the user.

The modulation symbols for the data streams are provided to a TX MIMO processor 1220, which may further process the modulation symbols (e.g., for OFDM). TX MIMO processor 1220 provides NT symbol streams to NT transmitters (TMTR) 1222a through 1222t. In some aspects, TX MIMO processor 1220 applies beam-forming weights to the symbols of the data streams based upon the user to which the symbols are being transmitted and the antenna from which the symbol is being transmitted from that users channel response information.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 1222a through 1222t are transmitted from NT antennas 1224a through 1224t, respectively.

At receiver system 1250, the transmitted modulated signals are received by NR antennas 1252a through 1252t and the received signal from each antenna 1252 is provided to a respective receiver (RCVR) 1254. Each receiver 1254 conditions (e.g., filters, amplifies, and downconverts) a respective received signal, digitizes the conditioned signal to provide samples, and further processes the samples to provide a corresponding "received" symbol stream.

An RX data processor 1260 then receives and processes the NR received symbol streams from NR receivers 1254 based on a particular receiver processing technique to provide the rank number of "detected" symbol streams. The processing by RX data processor 1260 is described in further detail below. Each detected symbol stream includes symbols that are estimates of the modulation symbols transmitted for the corresponding data stream. RX data processor 1260 then demodulates, deinterleaves, and decodes each detected symbol stream to recover the traffic data for the data stream. The processing by RX data processor 1260 is complementary to that performed by TX MIMO processor 1320 and TX data processor 1214 at transmitter system 1210.

The channel response estimate generated by RX processor 1260 may be used to perform space, space/time processing at the receiver, adjust power levels, change modulation rates or schemes, or other actions. RX processor 1260 may further estimate the signal-to-noise-and-interference ratios (SNRs)

of the detected symbol streams, and possibly other channel characteristics, and provides these quantities to a processor 1270. RX data processor 1260 or processor 1270 may further derive an estimate of the "effective" SNR for the system. Processor 1370 then provides estimated channel information (CSI), which may comprise various types of information regarding the communication link and/or the received data stream. For example, the CSI may comprise only the operating SNR. The CSI is then processed by a TX data processor 1218, which also receives traffic data for a number of data streams from a data source 1216, modulated by a modulator 1280, conditioned by transmitters 1254a through 1254t, and transmitted back to transmitter system 1210.

At transmitter system 1210, the modulated signals from receiver system 1250 are received by antennas 1224, conditioned by receivers 1222, demodulated by a demodulator 1240, and processed by a RX data processor 1242 to recover the CSI reported by the receiver system. The reported CSI is then provided to processor 1230 and used to (1) determine the data rates and coding and modulation schemes to be used for the data streams and (2) generate various controls for TX data processor 1214 and TX MIMO processor 1220.

At the receiver, various processing techniques may be used to process the NR received signals to detect the NT transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

A MIMO channel formed by the NT transmit and NR receive antennas may be decomposed into Ns independent channels, with $N_S \leq \min\{N_T, N_R\}$. Each of the $N_S$ independent channels may also be referred to as a spatial subchannel (or a transmission channel) of the MIMO channel and corresponds to a dimension.

Figure 13:
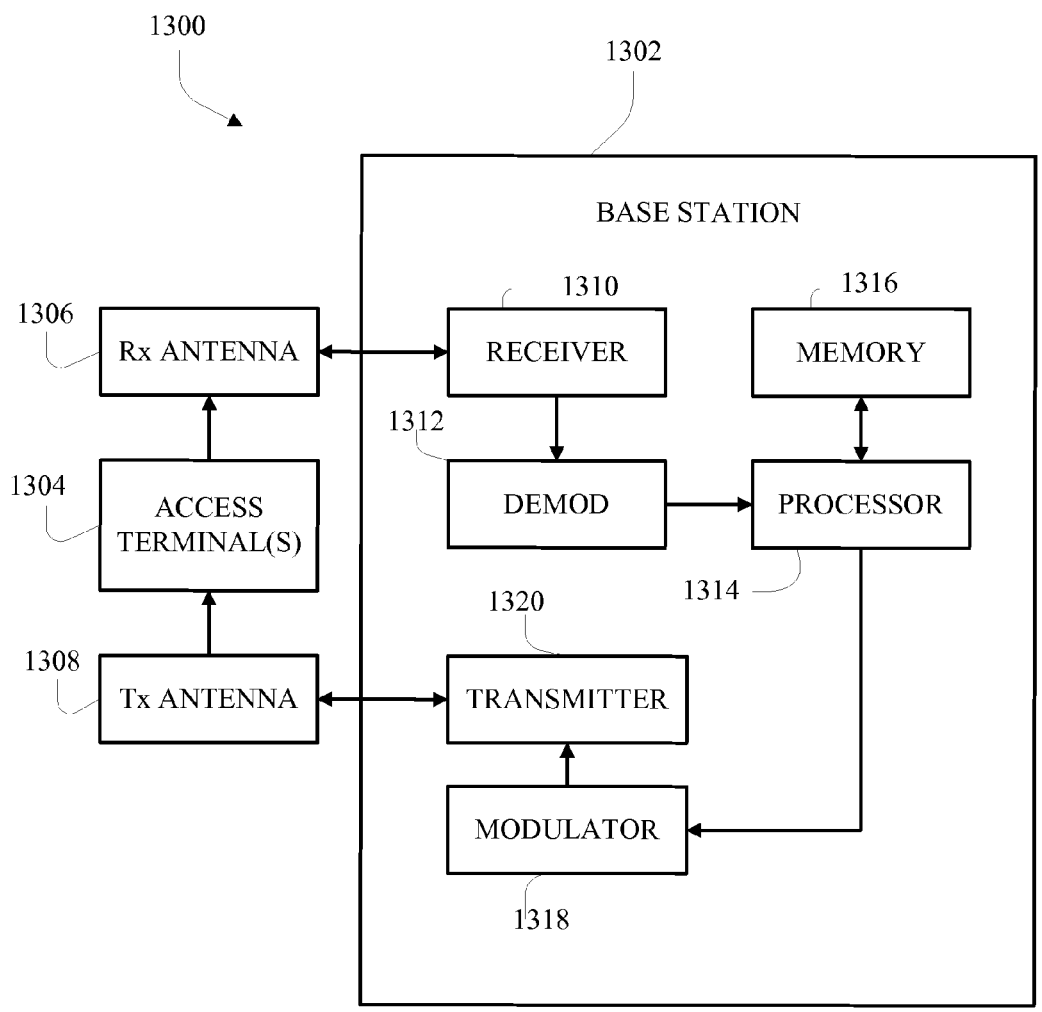
FIG. 13 is a block diagram of a system that coordinates providing for resource assignments in accordance with various aspects.

FIG. 13 illustrates a system for codebook exchange in a wireless communication environment in accordance with the various aspects. System 1300 comprises a base station 1302 with a receiver 1310 that receives signal(s) from one or more user devices 1304 (e.g., access terminals) through one or more receive antennas 1306, and transmits to the one or more user devices 1304 through a plurality of transmit antennas 1308. In one or more aspects, receive antennas 1306 and transmit antennas 1308 can be implemented using a single set of antennas. Receiver 1310 can receive information from receive antennas 1306 and is operatively associated with a demodulator 1312 that demodulates received information. Receiver 1310 can be, for example, a Rake receiver (e.g., a technique that individually processes multi-path signal components using a plurality of baseband correlators), an MMSE (Minimum Mean Square Error)-based receiver, or some other suitable receiver for separating out user devices assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 1314 that is similar to the processor described infra. with regard to FIG. 14, and is coupled to a memory 1316 that stores information related to user device assignments, lookup tables related thereto and the like.

Receiver output for each antenna can be jointly processed by receiver 1310 and/or processor 1314. A modulator 1318 can multiplex the signal for transmission by a transmitter 1320 through transmit antennas 1308 to user devices 1304.

Figure 14:
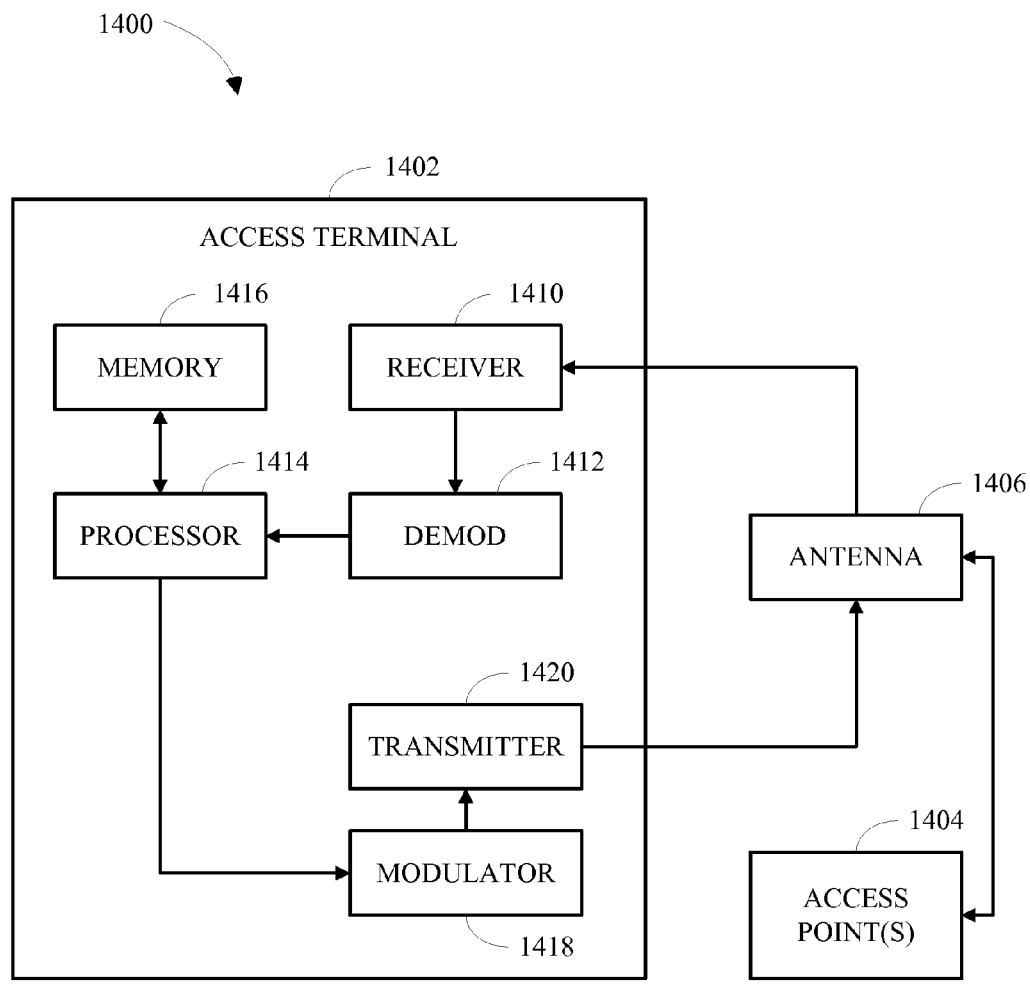
FIG. 14 is a block diagram of a system that coordinates receiving resource assignments in accordance with various aspects.

FIG. 14 is a block diagram of a system 1400 that coordinates signal acquisition in a wireless communication environment in accordance with various aspects described herein. In one example, system 1400 includes an access terminal 1402. As illustrated, access terminal 1402 can receive signal(s) from one or more access networks 1404 and transmit to the one or more access networks 1404 via an antenna 1406. Additionally, access terminal 1402 can comprise a receiver 1410 that receives information from antenna 1406. In one example, receiver 1410 can be operatively associated with a demodulator (Demod) 1412 that demodulates received information. Demodulated symbols can then be analyzed by a processor 1414. Processor 1414 can be coupled to memory 1416, which can store data and/or program codes related to access terminal 1402. Additionally, access terminal 1402 can employ processor 1414 to perform herein described methodologies and/or other appropriate methodologies. Access terminal 1402 can also include a modulator 1418 that can multiplex a signal for transmission by a transmitter 1420 via antenna 1406 to one or more access networks 1404.

It is to be understood that the aspects described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for assigning resources in a wireless communication network, comprising:

providing for a composite channel tree structure, wherein the composite channel tree structure includes a binary node tree structure and at least one supplemental node tree overlaying the binary tree structure, wherein each base node of the supplemental node tree is also a base node of the binary tree structure, at least one set of base nodes that have a common direct parent node of the supplemental node tree are not in a binary grouping;

generating an indexed table using the composite channel tree; and assigning resources according to the indexed table.

2. The method of claim 1, wherein providing for a composite channel tree structure further comprises providing for a composite channel tree structure, wherein the at least one supplemental node tree is facilitated by addition of a bit to a channel identification.

3. The method of claim 1, further comprising providing for a channel identification of at least seven (7) bits.

4. The method of claim 1, wherein the composite channel tree structure provides for defragmentation of resource assignments.

5. The method of claim 1, wherein the composite channel tree structure provides for reduced granularity in assigning resources.

6. The method of claim 1, wherein providing for a composite channel tree structure further comprises providing for a composite channel tree structure, wherein the at least one supplemental node tree includes up to one hundred and twenty-seven (127) supplemental nodes.

7. The method of claim 1, wherein providing for a composite channel tree structure further comprises providing for a composite channel tree structure, wherein the at least one supplemental node tree includes thirty-eight (38) supplemental nodes.

8. The method of claim 1, wherein providing for a composite channel tree structure further comprises providing for a composite channel tree structure that includes four first list structures having a maximum size of eight (8) base nodes per first list structure and a second list structure having a maximum size of thirty-two (32) base nodes.

9. The method of claim 1, wherein providing for a composite channel tree structure further comprises providing for a composite channel tree structure, wherein the at least one supplemental node tree having base node groupings of three (3).

10. The method of claim 1, wherein providing for a composite channel tree structure further comprises providing for a composite channel tree structure, wherein the at least one supplemental node tree having base node groupings of five (5).

11. The method of claim 1, wherein providing for a composite channel tree structure further comprises providing for a composite channel tree structure that includes four first list structures having a maximum size of eight (8) base nodes per first list structure and a second list structure having a maximum size of thirty-two (32) base nodes, a first node tree structure having base node groupings of three (3) and a second node tree structure having base node groupings of five (5).

12. An apparatus for assigning resources in a wireless communication network, comprising:

means for providing for a composite channel tree structure, wherein the composite channel tree structure includes a binary node tree and at least one supplemental node tree overlaying the binary node tree, wherein each base node of the supplemental node tree is also a base node of the binary tree, at least one set of base nodes that have a common direct parent node of the supplemental node tree are not in a binary grouping;

means for generating an indexed table using the composite channel tree; and means for assigning resources according to the indexed table.

13. A non-transitory machine-readable storage medium, comprising:

code for causing a computer to provide for a composite channel tree structure, wherein the composite channel tree structure includes a binary node tree and at least one supplemental node tree overlaying the binary node tree, wherein each base node of the supplemental node tree is also a base node of the binary tree, at least one set of base nodes that have a common direct parent node of the supplemental node tree are not in a binary grouping;

code for causing a computer to generate an indexed table using the composite channel tree; and code for causing a computer to assign resources according to the indexed table.

14. An integrated circuit that executes computer-executable instructions for assigning resources in a wireless communication network, wherein the instructions, when executed, cause the integrated circuit to:

provide for a composite channel tree structure, wherein the composite channel tree structure includes a binary node tree and at least one supplemental node tree overlaying the binary node tree, wherein each base node of the supplemental node tree is also a base node of the binary tree, at least one set of base nodes that have a common direct parent node of the supplemental node tree are not in a binary grouping;

generate an indexed table using the composite channel tree; and assign resources according to the indexed table.

15. A network apparatus for assigning resources in a wireless communication network, comprising:

at least one processor;

a memory coupled to the at least one processor;

a composite channel tree structure including a binary node tree and at least one supplemental node tree overlaying the binary node tree, wherein each base node of the supplemental node tree is also a base node of the binary tree, at least one set of base nodes that have a common direct parent node of the supplemental node tree are not in a binary grouping;

an index table generator stored in the memory, executable by the at least one processor and operable to generate an index table using the composite channel tree; and a resource assigner stored in the memory, executable by the least one processor and operable to assign resources according to the index table.

16. The network apparatus of claim 15, wherein the composite channel tree structure further comprises a composite channel tree structure, wherein the at least one supplemental node tree is facilitated by addition of a bit to a channel identification.

17. The network apparatus of claim 16, wherein the at least one supplemental node tree further comprises a supplemental node is facilitated by a channel identification of at least 7 bits.

18. The network apparatus of claim 15, wherein the composite channel tree structure provides for defragmentation of resource assignments.

19. The network apparatus of claim 15, wherein the composite channel tree structure provides for reduced granularity in assigning resources.

20. The network apparatus of claim 15, wherein the at least one supplemental node tree further comprises up to one hundred and twenty-seven (127) supplemental nodes.

21. The network apparatus of claim 15, wherein the at least one supplemental node tree further comprises thirty-eight (38) supplemental nodes.

22. The network apparatus of claim 15, wherein the composite channel tree structure further comprises four first list structures having a maximum size of eight (8) base nodes per first list structure and a second list structure having a maximum size of thirty-two (32) base nodes, a first node tree structure having base node groupings of three (3) and a second node tree structure having base node groupings of five (5).

23. The network apparatus of claim 15, wherein the at least one supplemental node tree further comprises base nodes having groupings of three.

24. The network apparatus of claim 15, wherein the at least one supplemental node tree further comprises base nodes having groupings of five.

25. The network apparatus of claim 15, wherein the composite channel tree structure further comprises four first list structures having a maximum size of eight (8) base nodes per first list structure and a second list structure having a maximum size of thirty-two (32) base nodes, a first node tree structure having base node groupings of three (3) and a second node tree structure having base node groupings of five (5).

26. A method for receiving and applying resource assignments at an access terminal, the method comprising:
receiving forward link and reverse link resource assignments, wherein the resource assignments are based on an index table generated by using a composite channel tree that comprises a binary node tree and at least one supplemental node tree overlaying the binary node tree, wherein each base node of the supplemental node tree is also a base node of the binary tree, at least one set of base nodes that have a common direct parent node of the supplemental node tree are not in a binary grouping; and
applying resources according to the forward link and reverse link resource assignments.

27. The method of claim 26, wherein the at least one supplemental node tree is facilitated by addition of a bit to a channel identification.

28. The method of claim 26, wherein the at least one supplemental node tree is facilitated by providing for a channel identification of at least seven (7) bits.

29. The method of claim 26, wherein the at least one supplemental node tree provides for defragmentation of resource assignments.

30. The method of claim 26, wherein the at least one supplemental node tree provides for reduced granularity in assigning resources.

31. The method of claim 26, wherein the at least one supplemental node tree further comprises up to one hundred twenty-seven (127) supplemental nodes.

32. The method of claim 26, wherein the at least one supplemental node tree further comprises thirty-eight (38) supplemental nodes.

33. The method of claim 26, wherein the composite channel tree includes four first list structures having a maximum size of eight (8) base nodes per first list structure and a second list structure having a maximum size of thirty-two (32) base nodes, a first node tree structure having base node groupings of three (3) and a second node tree structure having base node groupings of five (5).

34. The method of claim 26, wherein the at least one supplemental node tree further comprises base nodes having groupings of three (3).

35. The method of claim 26, wherein the at least one supplemental node tree further comprises base nodes having groupings of five (5).

36. The method of claim 26, wherein the composite channel tree comprises four first list structures having a maximum size of eight (8) base nodes per first list structure and a second list structure having a maximum size of thirty-two (32) base nodes, a first node tree structure having base node groupings of three (3) and a second node tree structure having base node groupings of five (5).

37. An apparatus for receiving and applying resource assignments in a wireless communication network, comprising:
means for receiving forward link and reverse link resource assignments, wherein the resource assignments are based on an index table generated by using a composite channel tree that comprises a binary node tree and at least one supplemental node tree overlaying the binary node tree, wherein each base node of the supplemental node tree is also a base node of the binary tree, at least one set of base nodes that have a common direct parent node of the supplemental node tree are not in a binary grouping; and
means for applying resources according to the forward link and reverse link resource assignments.

38. A non-transitory machine-readable storage medium, comprising:
code for causing a computer to receive forward link and reverse link resource assignments, wherein the resource assignments are based on an index table generated by using a composite channel tree that comprises a binary node tree and at least one supplemental node tree overlaying the binary node tree, wherein each base node of the supplemental node tree is also a base node of the binary tree, at least one set of base nodes that have a common direct parent node of the supplemental node tree are not in a binary grouping; and
code for causing a computer to apply resources according to the forward link and reverse link resource assignments.

39. An integrated circuit that executes computer-executable instructions for receiving and applying resource assignments in a wireless communication network, wherein the instructions, when executed, cause the integrated circuit to:
receive forward link and reverse link resource assignments, wherein the resource assignments are based on an index table generated by using a composite channel tree that comprises a binary node tree and at least one supplemental node tree overlaying the binary node tree, wherein each base node of the supplemental node tree is also a base node of the binary tree, at least one set of base nodes that have a common direct parent node of the supplemental node tree are not in a binary grouping; and
apply resources according to the forward link and reverse link resource assignments.

40. An apparatus for receiving and applying resource assignments in a wireless communication network assigning resources in a wireless communication network, comprising:
at least one processor;
a memory coupled to the at least one processor; and
a resource assignment module stored in the memory, executable by the at least one processor and operable to receive forward link and reverse link resource assignments, wherein the resource assignments are based on an index table generated by using a composite channel tree that comprises a binary node tree and at least one supplemental node tree overlaying the binary node tree, wherein each base node of the supplemental node tree is also a base node of the binary tree, at least one set of base nodes that have a common direct parent node of the supplemental node tree are not in a binary grouping, and wherein the resource assignment module is further operable to apply resources according to the forward link and reverse link resource assignments.

41. The apparatus of claim 40, wherein the at least one supplemental node tree is facilitated by addition of a bit to a channel identification.

42. The apparatus of claim 40, wherein the at least one supplemental node tree is facilitated by providing for a channel identification of at least seven (7) bits.

43. The apparatus of claim 40, wherein the at least one supplemental node tree provides for defragmentation of resource assignments.

44. The apparatus of claim 40, wherein the at least one supplemental node tree provides for reduced granularity in assigning resources.

45. The apparatus of claim 40, wherein the at least one supplemental node tree further comprises up to one hundred twenty-seven (127) supplemental nodes.

46. The apparatus of claim 40, wherein the at least one supplemental node tree further comprises thirty-eight (38) supplemental nodes.

47. The apparatus of claim 40, wherein the composite channel tree includes four first list structures having a maximum size of eight (8) base nodes per first list structure and a second list structure having a maximum size of thirty-two (32) base nodes, a first node tree structure having base node groupings of three (3) and a second node tree structure having base node groupings of five (5).

48. The apparatus of claim 40, wherein the at least one supplemental node tree further comprises base nodes having groupings of three (3).

49. The apparatus of claim 40, wherein the at least one supplemental node tree further comprises base nodes having groupings of five (5).

50. The apparatus of claim 40, wherein the composite channel tree comprises four first list structures having a maximum size of eight (8) base nodes per first list structure and a second list structure having a maximum size of thirty-two (32) base nodes, a first node tree structure having base node groupings of three (3) and a second node tree structure having base node groupings of five (5).

* * * * *